United States Patent [19]

Fantazier et al.

[11] 3,864,143

[45] Feb. 4, 1975

[54] CHEMICAL EMBOSSING USING ULTRAVIOLET RADIATION

[75] Inventors: Richard M. Fantazier, Columbia, Pa.; James N. Wells, Cottage Grove, Minn.

[73] Assignee: Armstrong Cork Company, Lancaster, Pa.

[22] Filed: June 22, 1972

[21] Appl. No.: 265,141

[52] U.S. Cl................ 117/10, 117/8.5, 117/11, 117/93.31, 161/116, 161/159, 264/25, 264/52, 264/54, 264/DIG. 5, 264/DIG. 60
[51] Int. Cl.............................................. B44c 1/02
[58] Field of Search............ 117/8.5, 10, 11, 93.31; 161/159, 160, 161; 264/52, DIG. 82, 55, 54, 45, 47

[56] References Cited
UNITED STATES PATENTS

| | | | |
|---|---|---|---|
| 2,825,282 | 3/1958 | Gergen et al. | 117/45 X |
| 3,085,896 | 4/1963 | Britt et al. | 117/33 X |
| 3,293,108 | 12/1966 | Nairn et al. | 161/160 X |
| 3,330,784 | 7/1967 | Anspon | 161/159 X |
| 3,365,353 | 1/1968 | Witman | 161/160 X |
| 3,373,072 | 3/1968 | Jones | 161/160 X |
| 3,453,171 | 7/1969 | Crowley | 117/93.31 X |
| 3,574,659 | 4/1971 | Kwart et al. | 161/161 X |
| 3,619,246 | 11/1971 | Bragole | 117/93.31 X |
| 3,627,858 | 12/1971 | Parts et al. | 161/160 X |

FOREIGN PATENTS OR APPLICATIONS

| | | | |
|---|---|---|---|
| 1,147,983 | 4/1969 | Great Britain | 161/159 UX |

*Primary Examiner*—William D. Martin
*Assistant Examiner*—Shrive P. Beck

[57] ABSTRACT

A sheet material is formed containing a chemical expanding agent. The areas of the sheet where expansion is to be permitted are masked, and areas where expansion is to be restricted are exposed to an intense source of ultraviolet radiation. Those areas exposed to ultraviolet radiation have had the expanding agent decomposed so that, when the sheet is subsequently heated above the decomposition point of the expanding agent, the unmasked areas will not expand or raise up as much as the masked areas.

2 Claims, 2 Drawing Figures

PATENTED FEB 4 1975 3,864,143
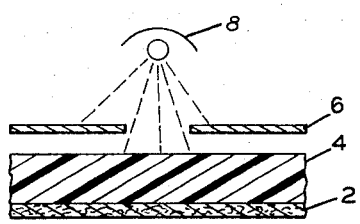
Fig. I
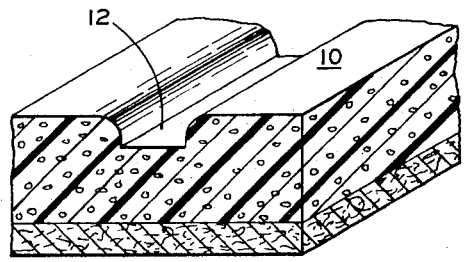
Fig. II

3,864,143

CHEMICAL EMBOSSING USING ULTRAVIOLET RADIATION

BACKGROUND OF THE INVENTION

1. Field of the Invention

The invention herein is directed to a floor covering and, more particularly, to a floor covering which is chemically embossed.

2. Description of the Prior Art

The technique for chemically embossing flooring is taught in U.S. Pat. No. 3,293,108. Therein, a chemical expanding agent is placed within a foamable formulation. A pattern is printed on the foamable formulation, and the ink which is used to print the pattern contains an inhibitor which restricts foaming in the printed areas.

U.S. Pat. No. 3,453,171 teaches the making of an embossed cellular polymeric sheet material by providing the gas-retentive polymeric sheet material with a blowing agent. The sheet is irradiated in selected portions to cross-link the resin, and then the sheet is heated to decompose the blowing agent. This then provides an embossed product.

U.S. Pat. No. 2,825,282 teaches the use of an ultraviolet radiation source for the treating of a foamable material. The ultraviolet radiation is used during processing, and a foamable material of different heights is formed.

While different techniques have been taught in the prior art using individual features of the invention herein, the prior art specifically lacks the teaching of ultraviolet radiation to decompose an expanding agent in selected areas so that subsequent processing of a sheet will provide it with an embossed effect. It is this technique which provides a relatively simple manufacturing process.

SUMMARY OF THE INVENTION

The invention is directed to a method of obtaining an embossed pattern on a vinyl sheet or film. A formulation containing a chemical expanding agent is consolidated at a temperature below the decomposition point of the expanding agent. The areas of the sheet where expansion is to be restricted are then exposed to an intense source of ultraviolet radiation for a relatively short period of time. The temperature at which this irradiation occurs is low enough so that the viscosity of the sheet is not altered, and the viscosity of the sheet stays such as to not support the development of a cell structure during the decomposition of the expanding agent which is subject to the ultraviolet treatment. After irradiation, the sheet is heated by normal methods to a temperature above the decomposition point of the expanding agent. At this time, those areas which were not exposed to the ultraviolet light are expanded to give a relatively low density foam. Much less expansion takes place in the irradiated areas since the expanding agent was previously decomposed during the ultraviolet treatment.

BRIEF DESCRIPTION OF THE DRAWING

FIG. I of the drawing is a side view of the irradiation treatment; and

FIG. II is a perspective view of a product made according to the method herein.

DESCRIPTION OF THE PREFERRED EMBODIMENT

The method herein is carried out by preparing a plastisol mix and applying it to a backing material 2. The backing is needed simply to keep the liquid mix in position. The mix 4 is applied to a thickness of about 8 mils and is then heated at 270° F. for four minutes to effect its gellation.

A typical plastisol which has been formulated and used is as follows:

| | Percent by Weight |
|---|---|
| Vinyl Resin Exon 605 -vinyl chloride homopolymer - sp. viscosity 0.33 | 33.10 |
| Vinyl Resin - Geon 124 - vinyl chloride homopolymer - sp. viscosity 0.50 | 33.10 |
| Activator, ABC-18 - zinc 2-Ethyl hexanoate | .66 |
| Blowing Agent, Azodicarbonamide | 3.98 |
| Plasticizer, Dioctyl phthalate | 25.80 |
| Drapex 4.4, Epoxidized soybean tallate | 3.30 |

While the above formulation has been used, it would be possible to use any one of the proposed formulations set forth in above-mentioned U.S. Pat. No. 3,293,108 for forming the mix therein which is gelled and then subsequently printed.

After the mix has been gelled on the backing material, it is placed beneath a mask 6 which may be aluminum foil or any other suitable material which will provide both exposed and unexposed areas on the same sample. The mix 4 which is partially covered by the mask 6 is now exposed to a light source 8. The mix is exposed for a short period of time to the ultraviolet radiation from the light source 8. Due to the presence of the mask, only certain portions of the mix will be exposed to the ultraviolet radiation. After exposure, the mask is removed and the sample is heated to 370° F. for 3 minutes to effect expansion. At this point, the azodicarbonamide functions as a blowing agent and it causes the expansion in the mix.

In FIG. II, there is shown the result of the expansion. The area 10 was covered by the mask 6 and, therefore, will expand to its normal full height. However, the area 12 was exposed to the ultraviolet radiation and will not expand as far as the area 10. This is because the radiated areas had the expanding agent decomposed therein during the ultraviolet radiation treatment. Consequently, there was not then sufficient expanding agent in the regions 12 to effect full expansion of these areas as compared to the masked areas 10.

EXAMPLE I

A sample of the above plastisol mix was exposed to radiation from a 100-watt medium pressure mercury arc lamp at ambient temperature for 322 minutes at a distance of 2.7 inches from the lamp. Subsequent expansion yielded a foam having an approximate height of 45 mils in the unexposed or masked areas and 20 mils in the exposed or unmasked areas.

EXAMPLE II

A sample of the plastisol mix described above was exposed to radiation from a Sylvania 275-watt sun lamp at a distance of 6 inches for 25 minutes. Subsequent expansion yielded a foam having noticeably less expansion in the exposed and unmasked areas than in the unexposed or masked areas.

EXAMPLE III

A sample of the plastisol mix described above was partially coated with a 10% solution of benzophenone (a photosensitizer) in tetrahydrofuran. The sample was masked in such a way that both the masked and unmasked areas contained both the benzophenone-treated and untreated regions. The sample was then exposed to a Sylvania 275-watt sun lamp at a distance of 6 inches for 25 minutes and then expanded in the usual way. The degree of expansion was greatest in the unexposed areas, less in the exposed, untreated areas, and least in the exposed, benzophenone-treated areas.

In the above, the temperatures at which irradiation occurs were low enough so that the radiation would not cause fusion of the gelled plastisol mix and thus provide the mix with the viscosity which would be necessary to cause the sheet to expand as the expanding agent was being decomposed under the effect of the ultraviolet radiation. In effect, the viscosity of the sheet during the ultraviolet radiation treatment is not too high so that it will support the development of a cell structure. Naturally, after radiation when the sheet is heated to 370° F., the normal expansion of the undecomposed expanding agent takes place. Since the masked areas now have more expanding agent than exists in the unmasked areas, there will be a difference in foam height, thus providing an embossed type product.

What is claimed is:

1. The method of obtaining an embossed pattern on a sheet utilizing a plastisol mix containing a decomposable expanding agent, comprising the steps of, preparing a plastisol mix which is capable of being foamed and containing an expanding agent, heating the mix at a point below the decomposition point of the expanding agent to effect its gellation, masking portions of the gelled mix, then exposing the unmasked portions of the gelled mix to ultraviolet radiation which will then decompose the expanding agent in the gelled mix in the unmasked regions without expansion of the gelled mix, said irradiation temperature being insufficient to cause fusion of the gelled plastisol mix, and then subsequently heating the total mix for fusion of the gelled plastisol and to effect expansion of the remaining expanding agent whereby an embossed type product is formed with the masked areas having a greater foam height than the unmasked areas.

2. The method of claim 1 wherein the gelled mix is surface treated with a photosensitizer prior to irradiation by the ultraviolet light source.

* * * * *